United States Patent
Kang et al.

(10) Patent No.: US 12,206,480 B2
(45) Date of Patent: Jan. 21, 2025

(54) METHOD AND DEVICE FOR ASSESSING RADIO LINK QUALITY IN WIRELESS COMMUNICATION SYSTEM

(71) Applicant: LG ELECTRONICS INC., Seoul (KR)

(72) Inventors: Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 17/753,413

(22) PCT Filed: Mar. 10, 2021

(86) PCT No.: PCT/KR2021/002943
§ 371 (c)(1),
(2) Date: Mar. 2, 2022

(87) PCT Pub. No.: WO2021/182863
PCT Pub. Date: Jun. 19, 2021

(65) Prior Publication Data
US 2022/0294514 A1    Sep. 15, 2022

(30) Foreign Application Priority Data
Mar. 10, 2020    (KR) .................. 10-2020-0029690

(51) Int. Cl.
*H04L 5/00* (2006.01)
*H04B 7/06* (2006.01)
(Continued)

(52) U.S. Cl.
CPC ........... *H04B 7/0695* (2013.01); *H04L 1/203* (2013.01); *H04L 5/0051* (2013.01); *H04W 16/28* (2013.01); *H04W 76/19* (2018.02)

(58) Field of Classification Search
CPC . H04W 16/28; H04W 76/19; H04W 74/0833; Y02D 30/70; H04L 1/203;
(Continued)

(56) References Cited

U.S. PATENT DOCUMENTS

2018/0262313 A1    9/2018 Nam et al.
2019/0373450 A1*   12/2019 Zhou ..................... H04W 76/11
2022/0149922 A1*    5/2022 Wang .................... H04W 76/19

FOREIGN PATENT DOCUMENTS

WO    2019-138070    7/2019
WO    2019-193239    10/2019
(Continued)

OTHER PUBLICATIONS

Nokia, et al., "Failure Detection Resources for BFR", 3GPP TSG RAN WG1 #96, 3GPP Draft, R1-1902561, 3rd Generation Partnership Project (3GPP), No. Athens, Greece, Feb. 25, 2019-Mar. 1, 2019, 3 Pages, Feb. 16, 2019 (Year: 2019).*
(Continued)

*Primary Examiner* — Lan-Huong Truong
(74) *Attorney, Agent, or Firm* — LEE, HONG, DEGERMAN, KANG & WAIMEY

(57) ABSTRACT

Disclosed are a method and device for assessing radio link quality in a wireless communication system. A method for assessing radio link quality according to one embodiment of the present disclosure may comprise the steps of: receiving configuration information related to a control resource set (CORESET) from a base station; and assessing radio link quality on the basis of one or more reference signals (RS) for the CORESET related to a physical downlink control channel (PDCCH) monitored by a terminal. The radio link quality may be assessed on the basis of the one or more reference signals among a plurality of reference signals for
(Continued)

which a quasi co-location (QCL) related to a spatial reception parameter for the CORESET has been set.

9 Claims, 11 Drawing Sheets

(51) Int. Cl.
  *H04L 1/20* (2006.01)
  *H04W 16/28* (2009.01)
  *H04W 76/19* (2018.01)
(58) Field of Classification Search
  CPC ..... H04L 5/0051; H04L 5/0035; H04L 5/005; H04L 5/0053; H04B 7/0695; H04B 7/024; H04B 7/06964; H04B 7/06; H04B 7/0408; H04B 17/318
  See application file for complete search history.

(56) References Cited

FOREIGN PATENT DOCUMENTS

| WO | WO-2019193239 A1 * | 10/2019 | ............. H04B 17/24 |
| WO | 2019-215389 | 11/2019 | |
| WO | WO-2019215389 A2 * | 11/2019 | ........... H04B 7/0695 |
| WO | 2020-010630 | 1/2020 | |
| WO | 2020-033549 | 2/2020 | |

OTHER PUBLICATIONS

European Patent Office Application Serial No. 21768374.7, Search Report dated Jul. 19, 2023, 11 pages.
Japan Patent Office Application No. 2022-539225, Office Action dated Aug. 8, 2023, 3 pages.
3rd Generation Partnership Project, "Technical Specification, 5G; NR; Medium Access Control (MAC) protocol specification (3GPP TS 38.321 V15.8.0 Release 15)," ETSI TS 138 321 V15.8.0, Jan. 2020, 80 pages.
PCT International Application No. PCT/KR2021/002943, International Search Report dated Jul. 7, 2021, 4 pages.
Ericsson, "Remaining issues on multi-beam enhancements," Tdoc R1-1912058, 3GPP TSG-RAN WG1 Meeting #99, Nov. 2019, 16 pages.
Nokia et al., "On Enhancements to Initial Access Procedures for NR-U," R1-2000499, 3GPP TSG RAN WG1 Meeting #100-e, e-meeting, Feb. 2020, 10 pages.

* cited by examiner

METHOD AND DEVICE FOR ASSESSING RADIO LINK QUALITY IN WIRELESS COMMUNICATION SYSTEM

CROSS-REFERENCE TO RELATED APPLICATIONS

This application is the National Stage filing under 35 U.S.C. 371 of International Application No. PCT/KR2021/002943, filed on Mar. 10, 2021, which claims the benefit of earlier filing date and right of priority to Korean Application No. 10-2020-0029690 filed on Mar. 10, 2020, the contents of which are all hereby incorporated by reference herein in their entireties.

TECHNICAL FIELD

The present disclosure relates to a wireless communication system, and in more detail, relates to a method and an apparatus of assessing radio link quality in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of assessing radio link quality for performing a beam failure detection or radio link monitoring operation.

In addition, an addition technical object of the present disclosure is to provide a method and an apparatus of determining a reference signal used to assess radio link quality.

The technical objects to be achieved by the present disclosure are not limited to the above-described technical objects, and other technical objects which are not described herein will be clearly understood by those skilled in the pertinent art from the following description.

Technical Solution

A method of assessing radio link quality in a wireless communication system according to an aspect of the present disclosure may include receiving configuration information related to a control resource set (CORESET) from a base station and assessing radio link quality based on one or more reference signal (RSs) for a CORESET related to a physical downlink control channel (PDCCH) monitored by the terminal. The radio link quality may be assessed based on the one or more reference signals among a plurality of reference signals for which a quasi co-location (QCL) related to a spatial reception parameter for the CORESET is configured.

A terminal assessing radio link quality in a wireless communication system according to an additional aspect of the present disclosure may include one or more transceivers for transmitting and receiving a wireless signal and one or more processors controlling the one or more transceivers. The one or more processors may be configured to receive configuration information related to a control resource set (CORESET) from a base station and assess radio link quality based on one or more reference signal (RSs) for a CORESET related to a physical downlink control channel (PDCCH) monitored by the terminal. The radio link quality may be assessed based on the one or more reference signals among a plurality of reference signals for which a quasi co-location (QCL) related to a spatial reception parameter for the CORESET is configured.

One or more non-transitory computer readable media storing one or more instructions according to an additional aspect of the present disclosure may control a device which assesses radio link quality to receive configuration information related to a control resource set (CORESET) from a base station and assess radio link quality based on one or more reference signal (RSs) for a CORESET related to a physical downlink control channel (PDCCH) monitored by the terminal. The radio link quality may be assessed based on the one or more reference signals among a plurality of reference signals for which a quasi co-location (QCL) related to a spatial reception parameter for the CORESET is configured.

A processing apparatus configured to control a terminal for assessing radio link quality in a wireless communication system according to an additional aspect of the present disclosure may include one or more processors and one or more computer memories operably connected to the one or more processors and storing instructions that perform operations based on being executed by the one or more processors. The operations may include receiving configuration information related to a control resource set (CORESET) from a base station and assessing radio link quality based on one or more reference signal (RSs) for a CORESET related to a physical downlink control channel (PDCCH) monitored by the terminal. The radio link quality may be assessed based on the one or more reference signals among a plurality of reference signals for which a quasi co-location (QCL) related to a spatial reception parameter for the CORESET is configured.

A method of supporting the assessment of radio link quality by a terminal in a wireless communication system according to an additional aspect of the present disclosure may include transmitting configuration information related to a control resource set (CORESET) to a terminal. Based on one or more reference signal (RSs) for a CORESET related to a physical downlink control channel (PDCCH) monitored by the terminal, radio link quality may be assessed by the terminal and the radio link quality may be assessed based on the one or more reference signals among a plurality of reference signals for which a quasi co-location (QCL) related to a spatial reception parameter for the CORESET is configured.

A base station for supporting the assessment of radio link quality by a terminal according to an additional aspect of the present disclosure may include one or more transceivers for transmitting and receiving a wireless signal and one or more processors controlling the one or more transceivers. The one or more processors may be configured to transmit configuration information related to a control resource set (CORESET) to a terminal. Based on one or more reference signal (RSs) for a CORESET related to a physical downlink control channel (PDCCH) monitored by the terminal, radio link quality may be assessed by the terminal and the radio link quality may be assessed based on the one or more reference signals among a plurality of reference signals for which a quasi co-location (QCL) related to a spatial reception parameter for the CORESET is configured.

Advantageous Effects

According to an embodiment of the present disclosure, when a plurality of reference signals (in particular, a reference signal for which a QCL (quasi co-location) related to a spatial reception parameter is configured) are configured for one control resource set, a reference signal for assessing radio link quality may be determined.

In addition, according to an embodiment of the present disclosure, a beam failure detection and radio link monitoring operation for beam failure recovery may be performed even when a plurality of base stations/TRPs/panels/beams participate in PDCCH transmission.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
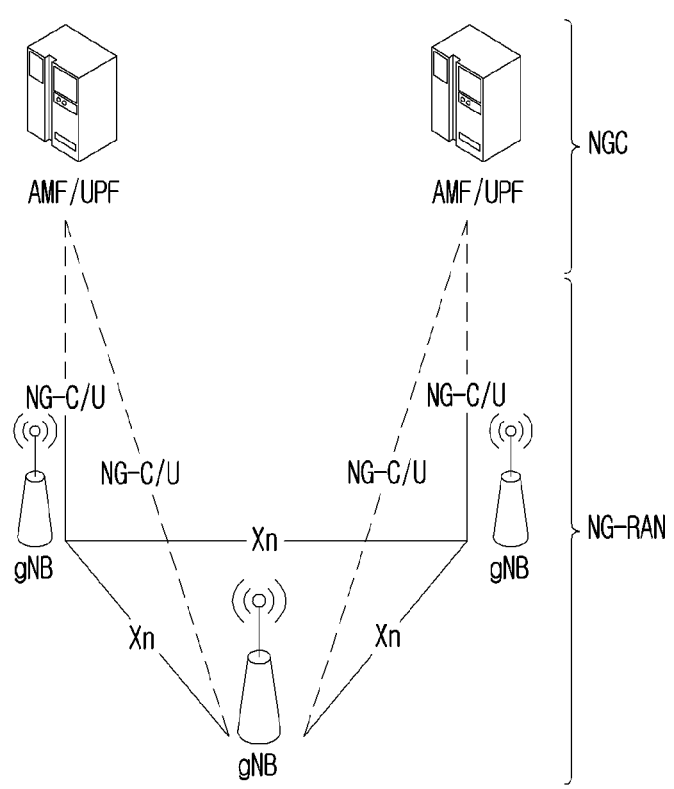
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
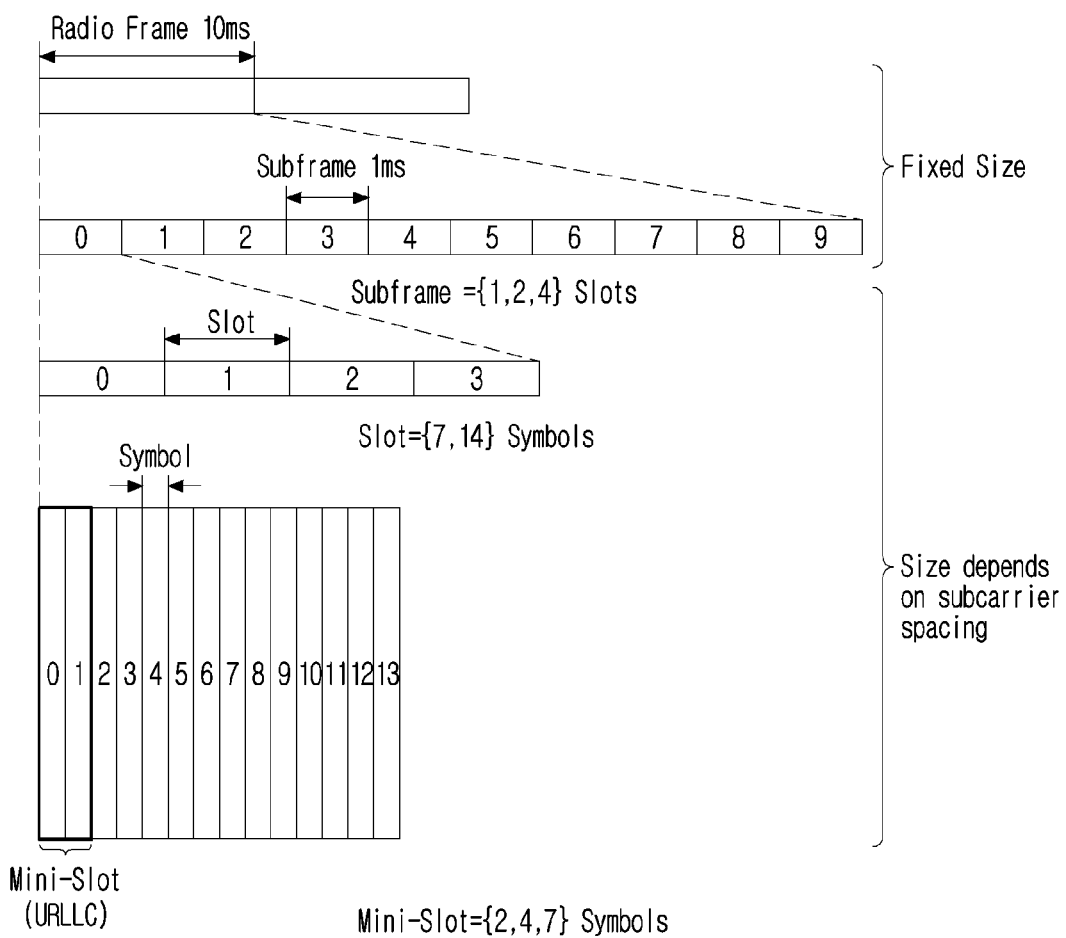
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c = 10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
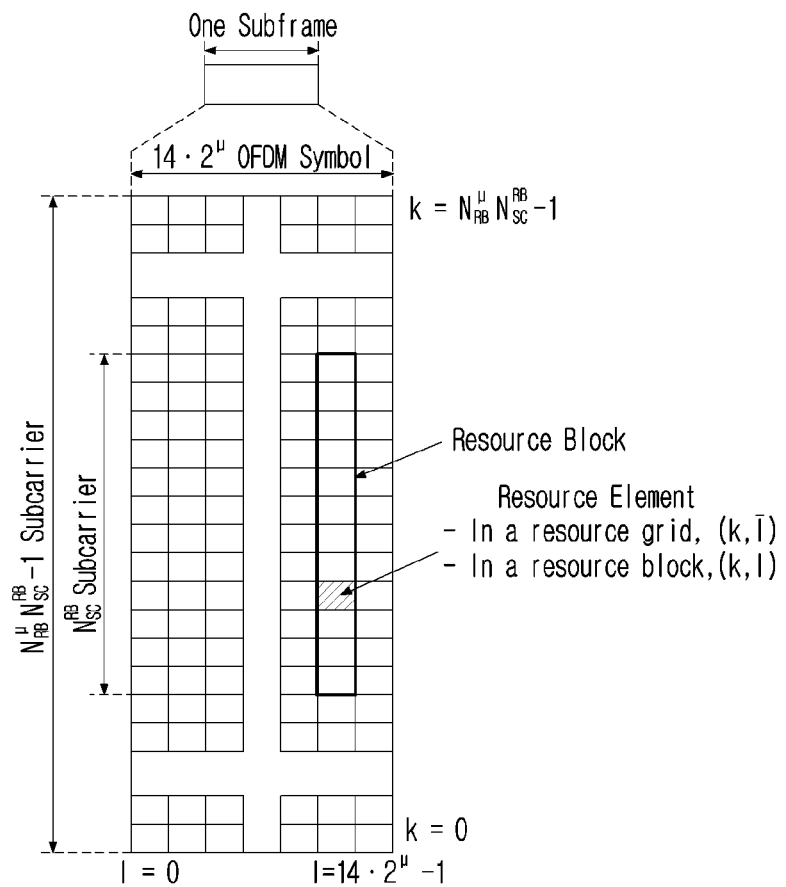
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
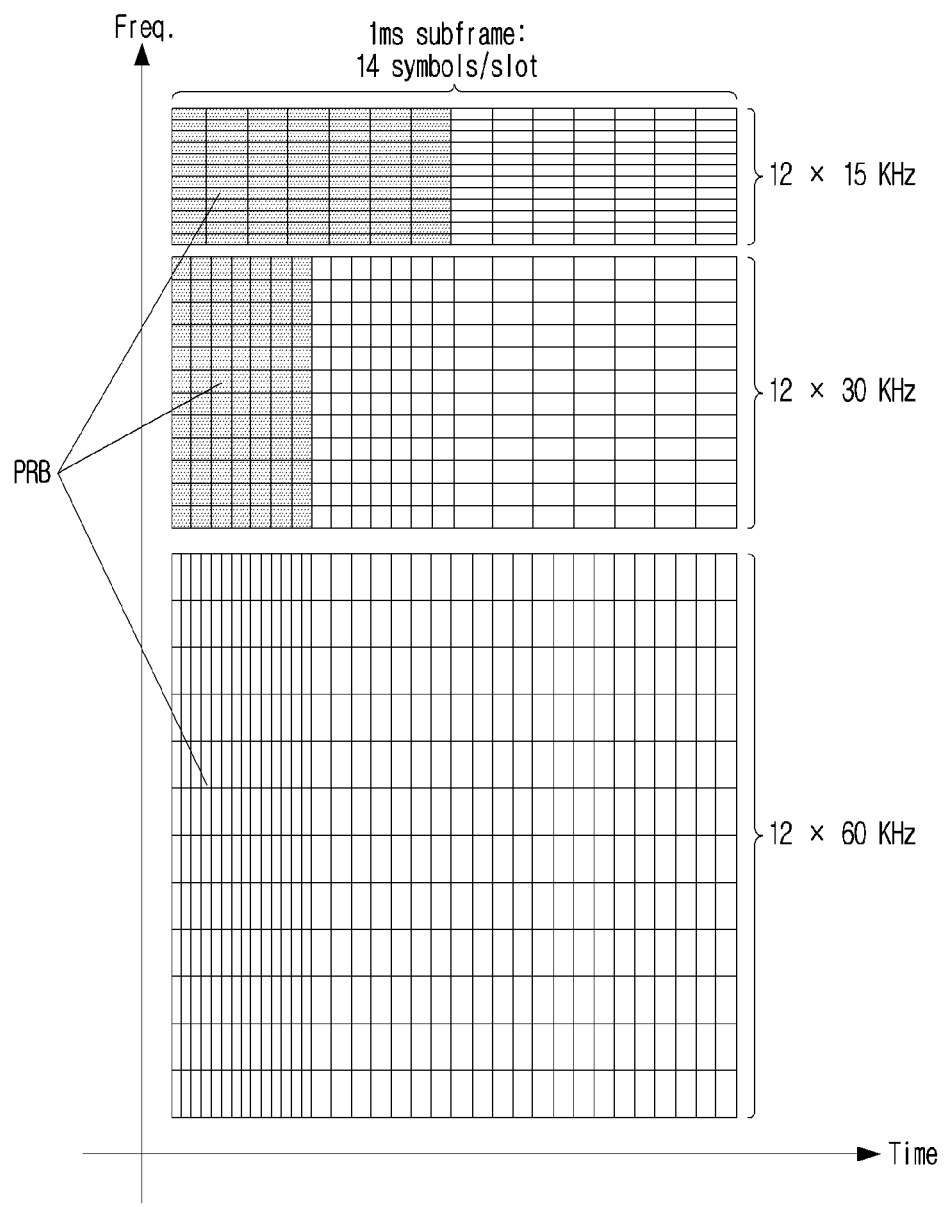
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
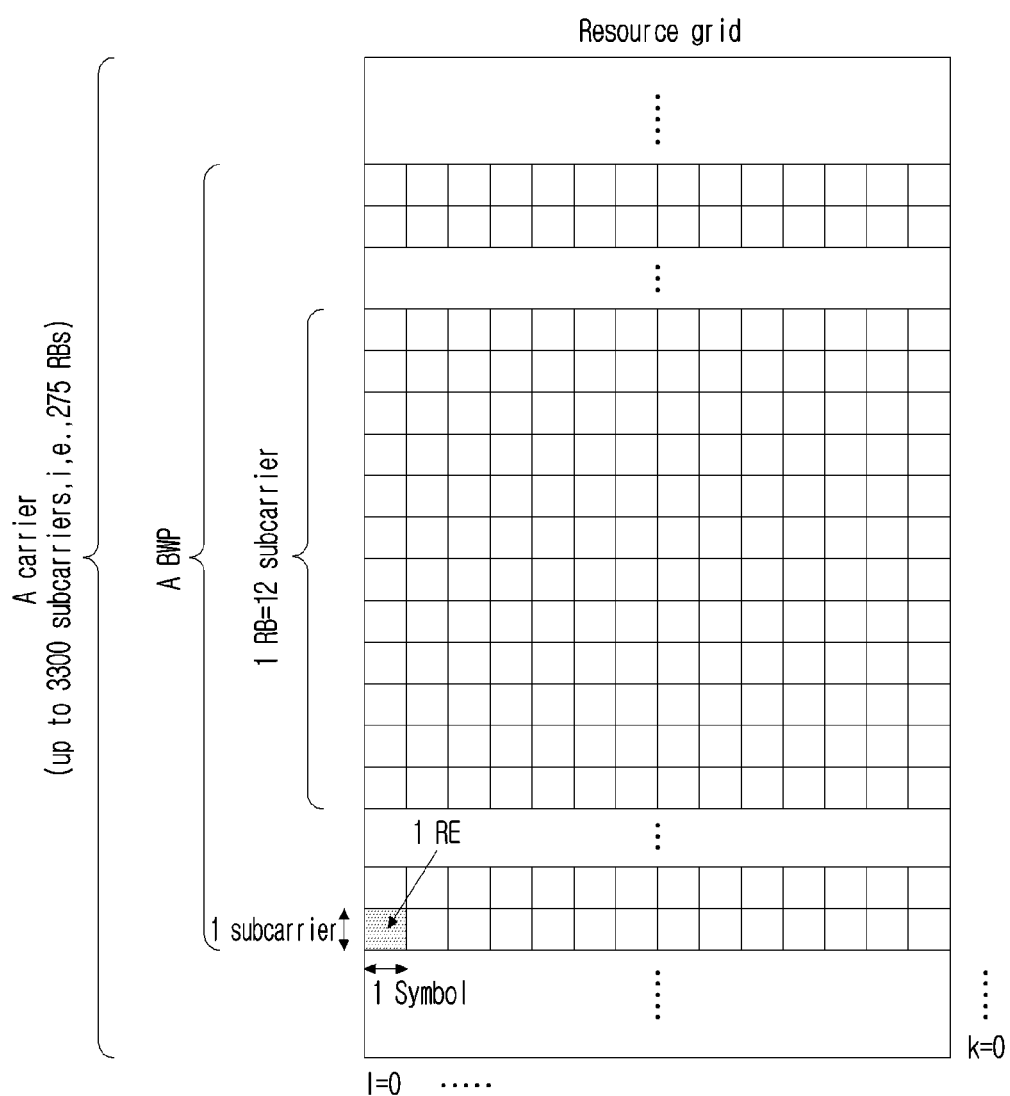
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
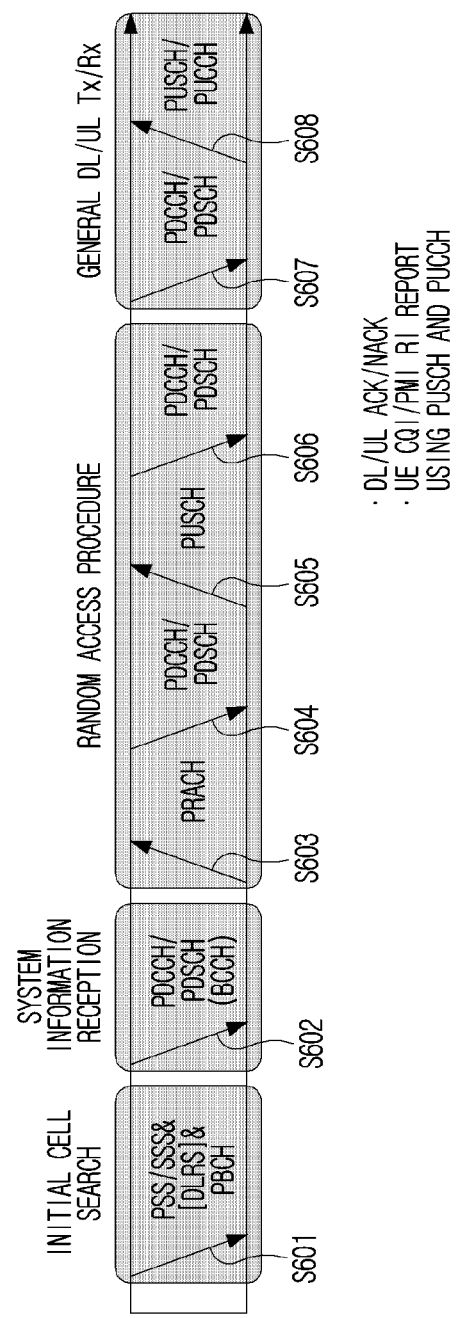
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Beam Failure Recovery

In performing a DL/UL beam management process, a beam mismatch problem may occur according to a configured beam management cycle. In particular, when a terminal moves or revolves or when a wireless channel environment is changed by the movement of a surrounding object (e.g., a beam is blocked to change a LoS (line-of sight) environment into a Non-LoS environment), the optimum DL/UL beam pair may be changed. Due to such a change, when tracking fails in a beam management process generally performed by a network indication, a beam failure event may be considered to occur. Whether such a beam failure event occurs may be determined by a terminal through reception quality of a downlink reference signal (RS). And, a reporting message for such a situation or a message for a beam recovery request (referred to as a BFRQ (beam failure recovery request) message) should be transmitted from a terminal. A base station which received such a beam failure recovery request message may perform beam recovery through a variety of processes such as beam RS transmission, beam reporting request, etc. for beam recovery. These series of beam recovery processes are referred to as beam failure recovery (BFR). A Rel-15 NR standardized a BFR (beam failure recovery) process for a primary cell (PCell) or a primary secondary cell (PScell) (the two are collectively referred to as a special cell (SpCell)) that a contention based PRACH resource always exists. As an operation in a serving cell, a corresponding BFR procedure is configured as follows with a beam failure detection (BFD) process of a terminal, a BFRQ process, and a process in which a terminal monitors a response of a base station to a BFRQ.

Figure 7:
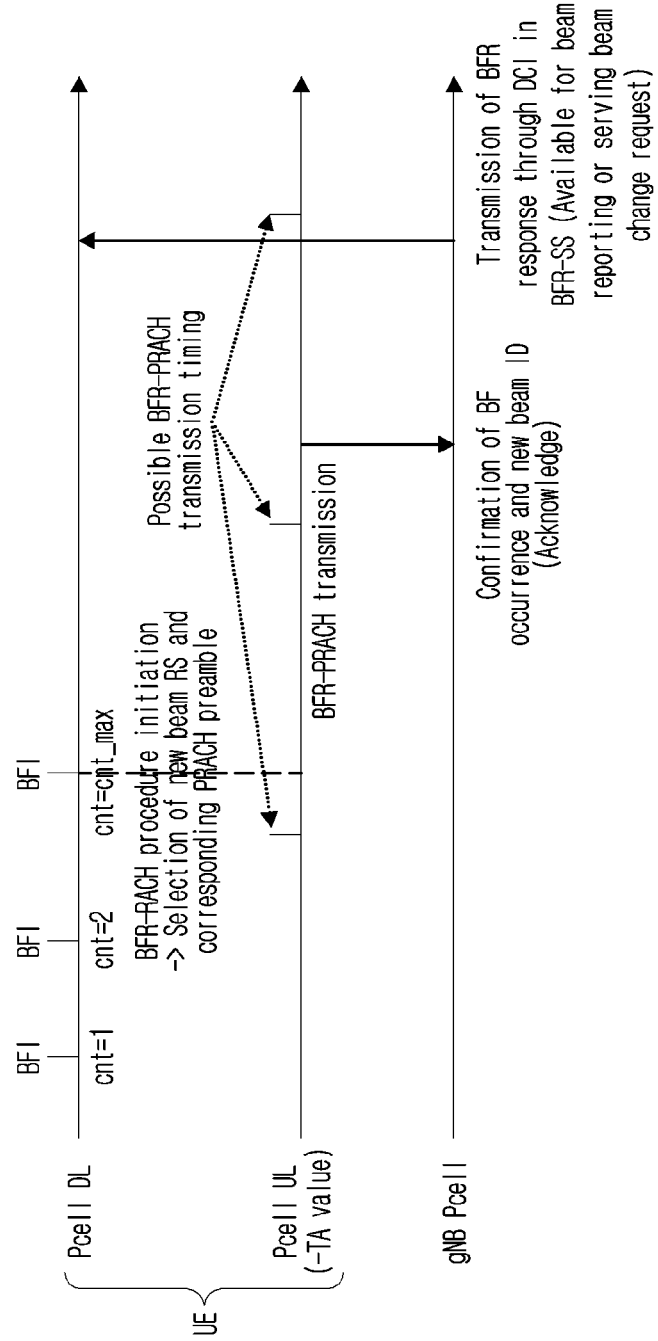
FIG. 7 is a diagram which illustrates a beam failure recovery operation for a Pcell in a wireless communication system to which the present disclosure may be applied.

FIG. 7 is a diagram which illustrates a beam failure recovery operation for a Pcell in a wireless communication system to which the present disclosure may be applied.

Hereinafter, in reference to FIG. 7, a beam failure recovery operation is described.

1) BFD (Beam Failure Detection)

When all PDCCH beams fall below a predetermined quality value (Q_out), it is said that one beam failure instance occurred. Here, quality is based on a hypothetical block error rate (BLER). In other words, it means a probability of a failure in demodulation of corresponding information when it is assumed that control information was transmitted to a corresponding PDCCH.

Here, one or a plurality of search spaces for monitoring a PDCCH may be configured to a terminal. Here, a beam may be differently configured per each search space. In this case, it means a case that all PDCCH beams for all search spaces fall below a BLER threshold. As a method for a terminal to determine a BFD RS, the following two methods are supported.

An implicit configuration for BFD RS(s): a CORESET (control resource set) ID (identifier), a resource region where a PDCCH may be transmitted, is configured in each search space. And, QCLed (Quasi Co-located) RS information for a spatial RX parameter (e.g., a CSI-RS resource ID, a SSB ID) may be indicated/configured per each CORESET ID. For example, a QCLed RS is indicated/configured by a TCI (transmit configuration information) indication in a NR standard. Here, a QCLed RS for a spatial RX parameter (e.g., QCL type D in TS38.214) means that a base station informs that a terminal equally uses (or may use) a beam used to receive a corresponding spatially QCLed RS (i.e., use the same spatial domain filter for reception) in receiving a corresponding PDCCH DMRS. Finally, from a viewpoint of a base station, it is a method of informing a terminal that transmission will be performed by applying the same transmission beam or a similar transmission beam (e.g., when a beam direction is same/similar, but a beam width is different) between spatially QCLed antenna ports. In other words, as described above, a terminal may determine (i.e., consider as the 'all PDCCH beams') as a BFD RS a QCLed (Quasi Co-located) RS for a spatial RX parameter configured to a CORESET for PDCCH reception.

An explicit configuration for BFD RS(s): a base station may explicitly configure beam RS(s) to a terminal for the purpose (beam failure detection). In this case, corresponding configured beam RS(s) correspond to the 'all PDCCH beams'.

Whenever an event occurs that a hypothetical BLER measured based on BFD RS(s) deteriorates over a specific threshold, a physical layer of a terminal informs a MAC sublayer that a beam failure instance (BFI) occurred. In a MAC sublayer of a terminal, when as many BFIs as the certain number of times (e.g., a value of a higher layer parameter, beamFailureInstanceMaxCount) occur within a certain time (i.e., within a BFD timer), a beam failure is determined (considered) to occur and a relevant RACH operation is initiated.

A MAC object operates as follows:
1> If a BFI is received from a lower layer (e.g., a physical layer):
2> Start or restart a BFD timer (beamFailureDetection-Timer);
2> Increase (increment) a BFI counter (BFI_COUNTER) by 1;
2> If a BFI counter (BFI_COUNTER) is equal to or greater than the maximum count (number of times) of BFIs (beamFailureInstanceMaxCount):
3> Initiate a Random Access procedure in a SpCell (refer to the above-described Random Access related procedure).
1> If a BFD timer (beamFailureDetectionTimer) is expired; or
1> If a BFD timer (beamFailureDetectionTimer), the maximum count (number of times) of BFIs (beamFailureInstanceMaxCount), or any reference signals used for beam failure detection is reconfigured by a higher layer (e.g., a RRC layer):
2> Set a BFI counter (BFI_COUNTER) as 0.
1> If a Random Access procedure is successfully completed:
2> Set a BFI counter (BFI_COUNTER) as 0;
2> If configured, stop a beam failure recovery timer (beamFailureRecoveryTimer);
2> Consider that a Beam Failure Recovery procedure was successfully completed 2) (PRACH Based) Beam Failure Recovery Request (BFRQ): New Beam Identification+PRACH Transmission As described in 1) Beam Failure Detection (BFD), when a certain number of BFIs or more occur, a terminal may determine that a beam failure occurred and perform a beam failure recovery operation. As an example of a Beam failure recovery operation, a beam failure recovery request (BFRQ) operation based on a RACH procedure (i.e., a PRACH) may be performed. Hereinafter, a corresponding BFRQ procedure is described in detail.

A base station may configure a RS list (e.g., candidate-BeamRSList) corresponding to candidate beams which may be substituted when a beam failure (BF) occurs through higher layer signaling (e.g., RRC) for a corresponding terminal. In addition, dedicated PRACH resources may be configured for corresponding candidate beams. Here, dedicated PRACH resources are non-contention based PRACH (also referred to as contention free PRACH) resources. If a terminal does not find a (proper) beam in a corresponding list, a terminal selects a contention based PRACH among preconfigured SSB resources and transmits it to a base station. A specific procedure is as follows.

Step 1) A terminal finds a beam with more than a predetermined quality value (Q_in) among RSs configured by a base station as a candidate beam RS set.
If one beam RS exceeds a threshold, a terminal selects a corresponding beam RS.
If a plurality of beam RSs exceeds a threshold, a terminal selects any one of corresponding beam RSs.
If no beam exceeds a threshold, a terminal performs the following step 2.
Here, beam quality may be based on a RSRP.

In addition, a RS beam set configured by the base station may include the following three cases. For example, all beam RSs in a RS beam set may be configured with SSBs. Alternatively, all beam RSs in a RS beam set may be configured with CSI-RS resources. Alternatively, beam RSs in a RS beam set may be configured with SSBs and CSI-RS resources.

Step 2) A terminal finds a beam with more than a predetermined quality value (Q_in) or more among SSBs (associated with a contention based PRACH resource).
If one SSB exceeds a threshold, a terminal selects a corresponding beam RS.
If a plurality of SSB s exceeds a threshold, a terminal selects any one of corresponding beam RSs.
If no beam exceeds a threshold, a terminal performs the following step 3.

Step 3) A terminal selects any SSB among SSBs (associated with a contention based PRACH resource).

A terminal transmits to a base station a preamble and a PRACH resource which is directly or indirectly associated and configured with a beam RS (CSI-RS or SSB) selected in the process.

Here, a direct association configuration is used in the following case.
When a contention-free PRACH resource and a preamble are configured for a specific RS in a candidate beam RS set which is separately configured for BFR
When a preamble and a (contention based) PRACH resource mapped one-to-one with SSBs which are commonly configured for other purposes such as random access, etc. are configured Alternatively, here, an indirect association configuration is used in the following case.
When a contention-free PRACH resource and a preamble are not configured for a specific CSI-RS in a candidate beam RS set which is separately configured for BFR Here, a terminal selects a preamble and a (contention free) PRACH resource associated with a SSB (i.e., QCLed (quasi-co-located) with respect to a spatial Rx parameter) designated to be receivable with the same Rx beam as a corresponding CSI-RS.

3) Monitoring of a Response of a Base Station to a BFRQ
A terminal monitors a response of a base station (gNB) to corresponding PRACH transmission.

Here, a response to the contention-free PRACH resource and preamble is transmitted to a PDCCH masked by a C-RNTI and a response is received in a search space (SS) which is separately configured by RRC for BFR.

Here, the search space is configured for a specific CORESET (for BFR).

For a response to a Contention PRACH, a search space and a CORESET (e.g., CORESET 0 or CORESET 1) configured for a general contention PRACH based random access process are reused as they are.

If there is no response for a certain period of time, 2) a process of identifying and selecting a new beam, and 3) a process of monitoring a response of a base station and a BFRQ are repeated.

The process may be performed until PRACH transmission reaches the preconfigured maximum number of times (N_max) or a configured timer (BFR timer) expires.

If the timer expires, a terminal stops contention free PRACH transmission, but may perform contention based PRACH transmission by a SSB selection until N_max is reached.

Improved Beam Failure Recovery (Rel-16)

As described above, Rel-15 NR standardized a PRACH based BFR process. However, it is applied only to a PCell or a PSCell due to a technical limit that any SCell may have no UL carrier in CA (carrier aggregation) and although there is a UL carrier, a contention based PRACH may not be configured. Such a limit has a limit that especially, when a SCell is operated in a high frequency band (e.g., 30 GHz) while operating a PCell in a low frequency band (e.g., below 6 GHz), BFR may not be supported in a high frequency band where BFR is actually needed. For this reason, standardization for BFR support on a SCell is performed in a Rel-16 NR MIMO work item. So far, as a result of a standardization discussion, UL transmission to a corresponding SCell is impossible at least for a DL only SCell, so it is planned to configure (dedicated) PUCCH resource(s), which are used for informing a base station that SCell beam failure occurred, in a SpCell and use it to perform a BFRQ for a SCell. Hereinafter, for convenience, the PUCCH is referred to as a BFR-PUCCH.

As described above, an object of a BFR-PRACH standardized in Rel-15 is to transmit 'occurrence of beam failure+new beam RS (set) information' together to a base station. Meanwhile, an object of a BFR-PUCCH is to inform only 'occurrence of beam failure to SCell(s)'. And, to which SCell(s) beam failure occurred (e.g., CC index(es)), whether there is a new beam for corresponding SCell(s) and a corresponding beam RS ID when there is a new beam (and quality(s) (e.g., a RSRP or a SINR) of corresponding beam RS(s)) may be reported as a subsequent MAC-CE (or UCI). Here, a subsequent beam report is not necessarily triggered all the time and it is possible to deactivate SCell(s) which are BFR configured for a corresponding terminal after a base station receives a BFR-PUCCH. A reason for such a design is because dozens of SCells may be associated with one PCell/PSCell and because from a viewpoint of a base station, there may be a lot of terminals sharing one PCell/PSCell UL, and considering even such a case, it is desirable to minimize the amount of UL resources reserved for a SCell BFRQ to each terminal in a PCell/PSCell.

CORESET (Control Resource Set) Control Resource Set)

A CORESET Information Element (IE) is used to configure a time/frequency CORESET for searching for downlink control information.

Table 6 illustrates a CORESET IE.

TABLE 6

```
-- ASN1START
-- TAG-CONTROLRESOURCESET-START
ControlResourceSet ::=             SEQUENCE {
   controlResourceSetId               ControlResourceSetId,
   frequencyDomainResources           BIT STRING (SIZE (45)),
   duration                           INTEGER (1..maxCoReSetDuration),
   cce-REG-MappingType                CHOICE {
      interleaved                        SEQUENCE {
         reg-BundleSize                     ENUMERATED { n2, n3, n6 },
         interleaverSize                    ENUMERATED { n2, n3, n6 },
         shiftIndex
INTEGER(0..maxNrofPhysicalResourceBlocks-1)    OPTIONAL -- Need S
      },
      nonInterleaved                     NULL
   },
   precoderGranularity                ENUMERATED {sameAsREG-bundle,
allContiguousRBs
   tci-StatesPDCCH-ToAddList          SEQUENCE(SIZE (1..maxNrofTCI-
StatesPDCCH)) OF TCI-StateId OPTIONAL, -- Cond NotSIB1-initialBWP
   tci-StatesPDCCH-ToReleaseList      SEQUENCE(SIZE (1..maxNrofTCI-
StatesPDCCH)) OF TCI-StateId OPTIONAL, -- Cond NotSIB1-initialBWP
   tci-PresentInDCI                   ENUMERATED { enabled }
OPTIONAL, -- Need S
   pdcch-DMRS-ScramblingID            INTEGER (0..65535)
OPTIONAL, -- Need S
   ...
}
-- TAG-CONTROLRESOURCESET-STOP
-- ASN1STOP
```

The following table 7 is a table which describes a field in a CORESET IE.

TABLE 7

| Description on a CORESET IE field |
|---|
| cce-REG-MappingType<br>Mapping of CCEs (control channel element) with REGs (resource element group)<br>controlResourceSetId<br>A value of 0 identifies a common CORESET (CORESET0, controlResourceSetZero) configured in a serving cell common configuration (ServingCellConfigCommon) or in a MIB (master information block) and is not used in this CORESET IE. A value of 1 to maxNrofControlResourceSets-1 identifies CORESETs configured by dedicated signaling or SIB1 (system information block 1). controlResourceSetId is unique among BWPs of a serving cell.<br>duration<br>Consecutive time duration of a CORESET in number of symbols (duration)<br>frequencyDomainResources |

TABLE 7-continued

Description on a CORESET IE field

Frequency domain resources for a CORESET. Each bit corresponds to a group of 6 RBs grouped starting from a first RB group in a BWP. A first (leftmost/most significant) bit corresponds to a first RB group in a BWP, and so on. A bit set as 1 indicates that this RB group belongs to a frequency domain resource of this CORESET. A bit corresponding to a group of RBs which are not entirely included in a BWP where a CORESET is configured is set as 0.
interleaverSize
Interleaver-Size
pdcch-DMRS-ScramblingID
Initialize PDCCH DMRS Scrambling. When this field is absent, UE applies a value of a physical cell identifier (physCellId) configured for this serving cell.
precoderGranularity
Precoder granularity in a frequency domain
reg-BundleSize
Resource element groups (REG) may be bundled to generate REG bundles. This parameter defines a size of such bundles.
shiftIndex
When this field is absent, UE applies a value of a physical cell identifier (physCellId) configured for this serving cell.
tci-PresentInDCI
This field indicates whether there is a TCI (transmission configuration indicator) field in DL-related DCI. When this field is absent, UE considers TCI to be absent/disabled. For cross carrier scheduling, a network sets this field to be used for a CORESET used for cross carrier scheduling in a scheduling cell.
tci-StatesPDCCH-ToAddList
A subset of TCI states defined in a PDSCH configuration (pdsch-Config) included in a DL BWP to which a CORESET belongs and a downlink dedicated BWP (BWP-DownlinkDedicated) corresponding to a serving cell. It is used to provide a QCL relation between PDCCH DMRS ports and DL RS(s) in one RS set (TCI state). A network configures an entry of the maximum number of PDCCH TCI states (maxNrofTCI-StatesPDCCH).
NotSIB1-initialBWP
This field is a field subject to conditional presence. When SIB1 is broadcast, this field is absent in a PDCCH common configuration (PDCCH-ConfigCommon) of a first BWP in SIB1 and a serving cell common configuration (ServingCellConfigCommon). Otherwise, it is optionally present.

A CORESET identifier (ControlResourceSetId) IE is related to a short identifier (short identity) used to identify a CORESET in a serving cell. ControlResourceSetId=0 identifies ControlResourceSet #0 configured through a PBCH (MIB) and controlResourceSetZero (serving cell common configuration (ServingCellConfigCommon)). An ID space is used in BWPs of a serving cell. The number of CORESETs per BWP is limited to 3 (including a common CORESET and a UE-specific CORESET). Table 8 illustrates a ControlResourceSetId IE.

TABLE 8

-- ASN1START
-- TAG-CONTROLRESOURCESETID-START
ControlResourceSetId ::=    INTEGER (0..maxNrofControlResource-Sets-1)
-- TAG-CONTROLRESOURCESETID-STOP
-- ASN1STOP A CORESET zero (ControlResourceSetZero) IE is used to configure CORESET #0 of a first BWP. Table 9 illustrates a ControlResourceSetZero IE.

TABLE 9

-- ASN1START
-- TAG-CONTROLRESOURCESETZERO-START
ControlResourceSetZero ::=    INTEGER (0..15)
-- TAG-CONTROLRESOURCESETZERO-STOP
-- ASN1STOP Multi-TRP (MTRP) URLLC In the present disclosure, DL MTRP-URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

In addition, in the present disclosure, UL MTRP-URLLC means that multiple TRPs receive the same data/UCI (uplink control information) from UE by using a different layer/time/frequency resource. For example, TRP 1 receives the same data/DCI from UE in resource 1 and TRP 2 receives the same data/DCI from UE in resource 2 and shares received data/DCI through a backhaul link connected between TRPs. UE configured with a UL MTRP-URLLC transmission method transmits the same data/UCI by using a different layer/time/frequency resource. Here, UE is configured which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, the meaning of using (or mapping) a specific TCI state (or a TCI) when receiving data/DCI/UCI for any frequency/time/space resource is as follows. For DL, it may means that a channel from a DMRS by using a QCL type and a QCL RS indicated by a corresponding TCI state in that frequency/time/space resource is estimated and data/DCI is received/demodulated based on the estimated channel. In addition, for UL, it may mean that a DMRS and data/UCI are transmitted/modulated by using a Tx beam and/or Tw power indicated by a corresponding TCI state in that frequency/time/space resource.

Here, the UL TCI state has Tx beam and/or Tx power information of UE and spatial relation information, etc. instead of a TCI state may be configured to UE through other parameter. An UL TCI state may be directly indicated by UL grant DCI or may mean spatial relation information of a SRS resource indicated by a SRI (SRS resource indicator) field of UL grant DCI. Alternatively, it may mean an OL (open loop) Tx power control parameter corresponding to a value indicated by a SRI field of UL grant DCI (e.g., j: an index for open loop parameter Po and alpha (a) (up to 32 parameter value sets per cell), q_d: an index of a DL RS resource for PL (pathloss) measurement (up to 4 measurements per cell), 1: a closed loop power control process index (up to 2 processes per cell)).

In the present disclosure, MTRP-eMBB means that multiple TRPs transmit other data (e.g., other TB) by using a different layer/time/frequency. UE configured with a MTRP-eMBB transmission method is indicated multiple TCI states by DCI and it is assumed that data received by using a QCL RS of each TCI state is different data.

Meanwhile, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, a UE considers as URLLC transmission and when CRC masking of DCI is performed by using a RNTI for eMBB, a UE consideres as eMBB transmission. Alternatively, a base station may configure MTRP URLLC transmission/reception or MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel (i.e., TRP corresponds to the panel) environments. In addition, a different TRP may be recognized by UE as a different TCI state. Therefore, when UE receives/transmits data/DCI/UCI by using TCI state 1, it means that data/DCI/UCI is received/transmitted from/to TRP 1.

In addition, in the present disclosure, when a plurality of base stations (i.e., MTRP) repetitively transmit the same PDCCH, it may mean that the same DCI is transmitted by a plurality of PDCCH candidates and it may mean that a plurality of base stations repetitively transmit the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI, and if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRP) partitively transmit the same PDCCH, it means that one DCI is transmitted by one PDCCH candidate and some resources that that PDCCH candidate is defined are transmitted by TRP 1 and remaining resources are transmitted by TRP 2.

In addition, in the present disclosure, when UE repetitively transmits the same PUSCH so that a plurality of base stations (i.e., MTRP) can receive it, it may mean that the UE transmits the same data through a plurality of PUSCHs. Here, each PUSCH may be optimized for an UL channel of a different TRP and transmitted. For example, when a UE repetitively transmits the same data through PUSCH 1 and 2, PUSCH 1 is transmitted by using UL TCI state 1 for TRP 1, here link adaptation such as a precoder/MCS, etc. may be also applied/scheduled with a value optimized for a channel of TRP 1. PUSCH 2 is transmitted by using UL TCI state 2 for TRP 2 and link adaptation such as a precoder/MCS, etc. may be also applied/scheduled with a value optimized for a channel of TRP 2. PUSCH 1 and 2 which are repetitively transmitted in this case may be transmitted at a different time to be TDM, FDM, SDM.

In addition, in the present disclosure, when UE partitively transmits the same PUSCH so that a plurality of base stations (i.e., MTRP) will receive it, it means that the UE transmits one data by one PUSCH, but a resource allocated to that PUSCH may be partitioned to optimize and transmit it to an UL channel of a different TRP. For example, when UE transmits the same data through 10 symbol PUSCHs, data is transmitted in 5 previous symbols by using UL TCI state 1 for TRP 1, and here, link adaptation such as a precoder/MCS, etc. may be also applied/scheduled with a value optimized for a channel of TRP 1. Remaining data is transmitted in remaining 5 symbols by using UL TCI state 2 for TRP 2, and here link adaptation such as a precoder/MCS, etc. may be also applied/scheduled with a value optimized for a channel of TRP 2. In the example, transmission for TRP 1 and transmission for TRP 2 are TDMed by dividing one PUSCH into time resources, but it may be transmitted by other FDM/SDM method.

Similar to the above-described PUSCH transmission, UE may repetitively transmit or partitively transmit the same PUCCH so that a plurality of base stations (i.e., MTRP) can receive a PUCCH.

A Method of BFD (Beam Failure Detection) and RLM (Radio Link Monitoring) in MTRP PDCCH Transmission First, BFD (beam failure detection) should be performed so that a terminal will perform beam failure recovery in a beamforming based communication environment. In a BFD process, a terminal generally determines whether of a beam failure based on expected quality of a PDCCH. In other words, a terminal determines whether of a BF by calculating a hypothetical BLER (block error rate) through a DL RS in a QCL relation with a PDCCH. NR Rel-17 is considering support of a method in which a plurality of base stations/ TRPs/panels/beams participate in PDCCH transmission to improve reliability or reception quality of a PDCCH. In this case, there are a plurality of DL RSs in a QCL relation with a PDCCH unlike before, so a problem of ambiguity on how a terminal should perform BFD based on which DL RS may occur. In the present disclosure, a method in which a terminal performs BFD/RLM in such an environment is proposed.

Hereinafter, a proposal of the present disclosure may be extended and applied to a variety of channels such as a PUSCH/a PUCCH/a PDSCH/a PDCCH, etc.

In Rel-16 eNR MIMO, standardization for single DCI based PDSCH transmission and multi DCI based PDSCH transmission was performed for multi-TRP PDSCH transmission. In Rel-17 FeNR MIMO, standardization for multi-TRP transmission (e.g., a PDCCH, a PUCCH, a PUSCH, etc.) excluding a PDSCH will be performed (hereinafter, multi-TRP is abbreviated to M-TRP, MTRP, etc.).

In the present disclosure, '/' means 'and' or 'or' or 'and/or' in context. In the present disclosure, a proposal is mainly described based on a PDCCH, but it is not limited thereto, and it can be also applied to a channel which is transmitted by a plurality of base stations/TRPs/panels/ beams together operating as a CoMP (Coordinated Multi-Point).

As described above, a variety of methods may be considered as a method in which a plurality of base stations/ TRPs/panels/beams participate in PDCCH transmission to improve reliability or reception quality of a PDCCH. For example, a method may be considered in which each base station/TRP/panel/beam encodes the same DCI respectively and repeatedly transmits it through different time/frequency/ space (antenna port or layer). Alternatively, a method may be considered in which the same PDCCH is repeatedly transmitted through different time/frequency/space (antenna port or layer). Alternatively, a method may be considered in which one PDCCH or encoded DCI bits are divided and transmitted through different time/frequency/space (antenna port or layer). Alternatively, multiple methods including a method in which one DCI is divided, encoded respectively and transmitted through different time/frequency/space (antenna port or layer) may be considered.

An interpretation/determination on whether the base station/TRP/panel/beam is same or different may be interpreted/determined by whether QCL reference RSs for each transmission signal are same or whether a QCL relation between QCL reference RSs is established. Finally, a configuration/indication of a plurality of QCL reference RSs for the same QCL parameter(s) on any unit for PDCCH transmission and reception (e.g., a CORESET/a search space/a CCE/a REG/a PDCCH occasion, etc.) may be considered as a common feature.

Hereinafter, for convenience of a description, it is described on the assumption that a plurality of QCL reference RSs (not in a QCL relation with) for the same QCL parameter(s) are configured/indicated for a CORESET (or a CORESET group), but a method proposed in the present disclosure is not limited thereto and may be also extended and applied to the above-described other PDCCH transmission configuration/indication unit (e.g., a search space/a CCE/a REG/a PDCCH occasion, etc.).

In addition, for convenience of a description, it is assumed that a plurality of TCI states defined in a NR system are configured/indicated for a CORESET (or a CORESET group) as 'the method in which a plurality of QCL reference RS s for the same QCL parameter(s) are configured/indicated'.

There are largely two methods in which a terminal determines a BFD (beam failure detection) RS (reference signal). In a method, a base station may explicitly configure/indicate a BFD RS. In addition, in the other method, a terminal determines a BFD RS through a PDCCH related configuration/indication (i.e., an implicit determination of a BFD RS). For the latter, a terminal confirms (calculates) a hypothetical BLER for a QCL (type-D) reference RS for each CORESET and increases a counter for a BFI (beam failure instance) one by one when all hypothetical BLERs are equal to or greater than a threshold. And, when a BFI counter (the number of times) is equal to or greater than a specific value (within a certain time of period), a terminal declares (determines) a BF (beam failure) and a terminal initiates transmission of a BFR-PRACH (a Rel-15 BFR method, i.e., BFR for a SpCell) or a BFR-PUCCH/a BFR-MAC-CE (a Rel-16 BFR method, i.e., BFR for a SCell). Here, when a plurality of QCL (type-D) reference RSs are configured for a specific CORESET (or a CORESET group), a method of determining a BFD RS is not specified. For example, the threshold value related to a hypothetical BLER may be predefined between a base station/a TRP and/or the threshold may be configured/transmitted by a base station/a TRP to a terminal. A method of determining a RLM RS for RLM (radio link monitoring) is similar to BFD and also in this case, as above, when a plurality of QCL (type-D, i.e., a QCL configuration/ type related to a spatial Rx parameter) reference RSs are configured for a specific CORESET (or a CORESET group), a method of determining a RLM RS is not specified.

Hereinafter, for convenience of a description, a proposal is described based on BFD, but it is obvious that the same methods may be applied also for RML.

Hereinafter, in the present disclosure, when a terminal confirms a hypothetical BLER, it may be interpreted in the same meaning as comparing a hypothetical BLER with a threshold. In addition, in the present disclosure, when a terminal confirms a hypothetical BLER, it may be interpreted in the same meaning as assessing radio link quality. In addition, as described above, a terminal may perform BFD (i.e., detect a BF) based on a method of assessing radio link quality according to a proposal of the present disclosure, and in addition, a method of assessing radio link quality according to a proposal of the present disclosure may be used for RLM.

Proposal 1: When a plurality of QCL (type-D) reference RSs are configured for a specific CORESET (or a CORESET group) and a BFD RS (or a RLM RS) is not separately configured by higher layer signaling (e.g., RRC, MAC CE), a terminal confirms a hypothetical BLER (i.e., assesses radio link quality) based on one specified/preconfigured/predetermined QCL (type-D) reference RS.

In other words, a terminal may confirm a hypothetical BLER (i.e., assess radio link quality) based on a specific QCL (type-D) reference RS (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH.

As an example of 'one specified/preconfigured/predetermined QCL (type-D) reference RS' in the above-described proposal 1, a QCL (type-D) reference RS corresponding to a stipulated/preconfigured/predetermined specific TCI state among a plurality of TCI states configured/indicated to a corresponding CORESET may be considered.

For example, a QCL (type-D) reference RS corresponding to a first TCI state among a plurality of TCI states configured/indicated to a corresponding CORESET may be considered. In another example, a QCL (type-D) reference RS corresponding to a last TCI state among a plurality of TCI states configured/indicated to a corresponding CORESET may be considered.

In other words, as a plurality of TCI states for a specific CORESET (e.g., a TCI-state IE) are configured, a plurality of QCL (type-D) reference RSs may be configured. In other words, each of a plurality of TCI states may include information on a QCL (type-D) RS. Here, a plurality of TCI states configured for a specific CORESET respectively provide a QCL relation between DL RS(s) in a TCI state (i.e., a QCL reference RS) and a PDCCH DMRS port.

In other words, a terminal may confirm a hypothetical BLER (i.e., assess radio link quality) based on a RS configured as QCL type-D indicated/configured by a specific TCI state among a plurality of RSs (i.e., RSs that a QCL related to a spatial Rx parameter are configured) configured as QCL type-D indicated/configured by a plurality of TCI states for a related CORESET used to monitor a PDCCH.

As described above, for a terminal, one or more search spaces may be configured. A hypothetical BLER may be confirmed (i.e., radio link quality may be assessed) based on a RS for a CORESET related to all search spaces configured for a terminal. Here, when a plurality of QCL (type-D) reference RSs (i.e., a RS that a QCL related to a spatial Rx parameter is configured) are configured for any CORESET, a hypothetical BLER may be confirmed (i.e., radio link quality may be assessed) based on any one QCL (type-D) reference RS of them. In one example, when a plurality of TCI states are configured for any CORESET, a hypothetical BLER may be confirmed (i.e., radio link quality may be assessed) based on a QCL (type-D) reference RS (i.e., a RS that a QCL related to a spatial Rx parameter is configured) in a specific TCI state among a plurality of TCI states. And, when a hypothetical BLER for all search spaces is equal to or greater than a threshold (i.e., when radio link quality is worse than a threshold), a physical layer of a terminal may provide an indication (i.e., a beam failure instance indication) to a higher layer (e.g., a MAC layer).

In addition, when a hypothetical BLER for all resources for RLM is equal to or greater than a threshold (i.e., when radio link quality is worse than a threshold), a physical layer of a terminal may provide out-of-sync to a higher layer (e.g., a MAC layer). Here, when a plurality of QCL (type-D) reference RSs are configured, a terminal may use a specific QCL (type-D) reference RS for RLM as in the proposal.

An advantage of this proposal is that terminal complexity is low, but a frequent RRC reconfiguration for TCI may occur according to a change in a TRP (or a beam, a wireless link) corresponding to best/worst quality.

For example, for PDCCH/DCI repeat transmission, if a TRP (or a beam, a wireless link) corresponding to a specified QCL (type-D) reference RS is not a best TRP (or a beam, a wireless link), it may be determined as a BF although successful reception of DCI is possible through other TRP (or beam, wireless link), so a first TCI state should be continuously changed into a RS corresponding to a best TRP (or beam, wireless link).

Proposal 2: When a plurality of QCL (type-D) reference RSs are configured for a specific CORESET (or a CORESET group) and a BFD RS (or a RLM RS) is not separately configured by higher layer signaling (e.g., RRC, MAC CE), a terminal confirms a hypothetical BLER (i.e., assesses radio link quality) based on one QCL (type-D) reference RS designated/configured by a base station.

In other words, a terminal may confirm a hypothetical BLER (i.e., assess radio link quality) based on a QCL (type-D) reference RS designated/configured by a base station (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH.

In proposal 2, a variety of signaling methods (e.g., a RRC message, a MAC-CE message, and/or DCI signaling) may be considered as a more specific method than 'a method that a base station designates a QCL (type-D) RS'.

For example, an order of a TCI state to perform BFD may be designated through MAC-CE which indicates/configures a TCI state of a CORESET. In other words, among a plurality of TCI states for a related CORESET used to monitor a PDCCH, a terminal may confirm a hypothetical BLER (i.e., assess radio link quality) based on a QCL (type-D) reference RS indicated/configured in a TCI state designated by MAC-CE (i.e., a RS that a QCL related to a spatial Rx parameter is configured).

In another example, a terminal performs BFD based on a first TCI state, but an indicator which may change an order of a plurality of TCI states (e.g., an indicator for whether a first TCI state and a second TCI state are swapped) may be introduced through separate MAC-CE or MAC-CE which indicates/configures a CORESET TCI state. In other words, an order of a plurality of TCI states for a related CORESET used to monitor a PDCCH may be determined through an indicator which changes an order of a plurality of TCI states. And, based on a determined order of TCI states, a terminal may confirm a hypothetical BLER (i.e., assess radio link quality) based on a QCL (type-D) reference RS indicated/configured in a first (i.e., a RS that a QCL related to a spatial Rx parameter is configured).

As described above, for a terminal, one or more search spaces may be configured. A hypothetical BLER may be confirmed (i.e., radio link quality may be assessed) based on a RS for a CORESET related to all search spaces configured for a terminal. Here, when a plurality of QCL (type-D) reference RSs (i.e., a RS that a QCL related to a spatial Rx parameter is configured) are configured for any CORESET, a hypothetical BLER may be confirmed (i.e., radio link quality may be assessed) based on any one QCL (type-D) reference RS of them. In one example, when a plurality of TCI states are configured for any CORESET, a hypothetical BLER may be confirmed (i.e., radio link quality may be assessed) based on a QCL (type-D) reference RS (i.e., a RS that a QCL related to a spatial Rx parameter is configured) in a specific TCI state among a plurality of TCI states. And, when a hypothetical BLER for all search spaces is equal to or greater than a threshold (i.e., when radio link quality is worse than a threshold), a physical layer of a terminal may provide an indication (i.e., an beam failure instance indication) to a higher layer (e.g., a MAC layer).

In addition, when a hypothetical BLER for all resources for RLM is equal to or greater than a threshold (i.e., when radio link quality is worse than a threshold), a physical layer of a terminal may provide out-of-sync to a higher layer (e.g., a MAC layer). Here, when a plurality of QCL (type-D) reference RSs are configured, a terminal may use a specific QCL (type-D) reference RS for RLM as in the proposal.

An advantage of this method is that terminal complexity is low and a base station may respond more flexibly (or faster) than proposal 1 as it is possible to change a QCL (type-D) RS designated by a base station according to a change in a TRP corresponding to best/worst TRP (or beam, wireless link) quality. But, signaling overhead following a QCL (type-D) RS designation/configuration of a base station may increase and a base station may be burdened with continuous quality tracking per TRP.

Proposal 3: When a plurality of QCL (type-D) reference RSs are configured for a specific CORESET (or a CORESET group) and a BFD RS (or a RLM RS) is not separately configured by higher layer signaling (e.g., RRC, MAC CE), a terminal confirms a hypothetical BLER (i.e., assesses radio link quality) based on a QCL (type-D) reference RS corresponding to best quality.

A method of proposal 3 is a method that a terminal determines a QCL (type-D) reference RS corresponding to a TRP of high quality and selects it as a BFD RS in order to reduce a base station's burden of tracking quality per TRP in proposal 2 (and proposal 1).

For example, a terminal may determine whether a hypothetical BLER of a QCL (type-D) reference RS corresponding to a lowest hypothetical BLER is equal to or greater than a threshold. In other words, a terminal may confirm a hypothetical BLER (i.e., assess radio link quality) based on a QCL (type-D) reference RS corresponding to a lowest hypothetical BLER (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH.

As described above, as a plurality of TCI states for a specific CORESET (e.g., TCI-state IE) are configured, a plurality of QCL (type-D) reference RSs may be configured. In other words, each of a plurality of TCI states may include information on a QCL (type-D) RS.

As a result, in a method of this embodiment, a terminal confirms a hypothetical BLER for all QCL (type-D) reference RSs respectively, but it may be considered equivalent to a method of determining whether at least one hypothetical BLER is equal to or less than a threshold (i.e., assess radio link quality).

In another example, whether a hypothetical BLER of a QCL (type-D) reference RS corresponding to a highest RSRP is equal to or greater than a threshold may be determined. In other words, a terminal may confirm a hypothetical BLER (i.e., assess radio link quality) based on a QCL (type-D) reference RS corresponding to a highest RSRP (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH. This method is a method that a BF probability prediction is less accurate than a first embodiment, but complexity of a terminal is lowered by using a RSRP value instead of a BLER estimation.

(In the above-described two embodiments) in order to lower terminal complexity, a QCL (type-D) RS (corresponding to a lowest BLER/a highest RSRP) may not be changed during a BFD time duration. In other words, a lowest BLER/highest RSRP value may be changed over time, but it may be fixed as a single QCL (type-D) RS during a BFD time duration. For example, within a BFD time duration, it may be determined based on a QCL (type-D) RS (corresponding to a lowest BLER/a highest RSRP) of a first BFI (beam failure indication). This method has an advantage that a base station does not need to perform a separate operation according to a best TRP change. In addition, this method focuses on avoiding determining it as a BF if even one TRP operates normally, so it may be more suitable for a case in which a PDCCH/DCI repeat method is applied. But, there is a limit that terminal complexity is higher than the proposal 1 or 2.

Proposal 4: When a plurality of QCL (type-D) reference RSs are configured for a specific CORESET (or a CORESET group) and a BFD RS (or a RLM RS) is not separately configured by higher layer signaling (e.g., RRC, MAC CE), a terminal confirms a hypothetical BLER (i.e., assesses radio link quality) based on a QCL (type-D) reference RS corresponding to worst quality.

The proposal 3 focuses on avoiding determining it as a BF if even one TRP operates normally, but for PDCCH/DCI fraction transmission, it may be not suitable because a terminal may normally receive a PDCCH/DCI only when all TRPs operate normally. Proposal 4 is a method that a BFD RS is selected based on a TRP of the lowest quality in such an environment (e.g., in particular, a DCI fraction transmission environment).

For example, a terminal may determine whether a hypothetical BLER of a QCL (type-D) reference RS corresponding to a highest hypothetical BLER is equal to or greater than a threshold. In other words, a terminal may confirm a hypothetical BLER (i.e., assess radio link quality) based on a QCL (type-D) reference RS corresponding to a highest hypothetical BLER (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH. As a result, in this method, a hypothetical BLER for all QCL (type-D) reference RSs is confirmed respectively, but it may be considered equivalent to a method of determining whether all hypothetical BLERs are equal to or less than a threshold.

In another example, a terminal may determine whether a hypothetical BLER of a QCL (type-D) reference RS corresponding to a lowest RSRP is equal to or greater than a threshold. In other words, a terminal may confirm a hypothetical BLER (i.e., assess radio link quality) based on a QCL (type-D) reference RS corresponding to a RSRP (i.e., a RS that a QCL related to a spatial Rx parameter is configured) among a plurality of QCL (type-D) reference RSs (i.e., a RS that a QCL related to a spatial Rx parameter is configured) for a related CORESET used to monitor a PDCCH. This method is a method that a BF probability prediction is less accurate than a first embodiment, but complexity of a terminal is lowered by using a RSRP value instead of a BLER estimation.

(In the above-described two embodiments) in order to lower terminal complexity, a QCL (type-D) RS (corresponding to a highest BLER/a lowest RSRP) may not be changed during a BFD time duration. In other words, a lowest BLER/highest RSRP value may be changed over time, but it may be fixed as a single QCL (type-D) RS during a BFD time duration. For example, within a BFD time duration, it may be determined based on a QCL (type-D) RS (corresponding to a highest BLER/a lowest RSRP) of a first BFI (beam failure indication). This method has an advantage that a base station does not need to perform a separate operation according to a worst TRP change. But, like proposal 3, there is a limit that terminal complexity is higher than the proposal 1 or 2.

Proposal 5: When a plurality of QCL (type-D) reference RSs are configured for a specific CORESET (or a CORESET group) and a BFD RS (or a RLM RS) is not separately configured by higher layer signaling (e.g., RRC, MAC CE), a terminal calculates and confirms a (combined/composite)

hypothetical BLER (i.e., assesses radio link quality) by using a plurality of corresponding QCL (type-D) reference RSs.

The proposal 3 focuses on avoiding determining it as a BF if even one TRP operates normally, but for PDCCH/DCI fraction transmission, it may be not suitable because a terminal may normally receive a PDCCH/DCI only when all TRPs operate normally. Proposal 4 is a method that a BFD RS is determined based on a TRP of the lowest quality in such an environment (e.g., in particular, a DCI fraction transmission environment). For PDCCH fraction transmission, if a TRP divides and transmits coded bits, it is more accurate to confirm a BLER by considering all QCL (type-D) reference RSs, so proposal 5 is proposed.

In other words, a terminal may confirm a hypothetical BLER (i.e., assess radio link quality) by entirely using a plurality of QCL (type-D) reference RSs (i.e., a RS that a QCL related to a spatial Rx parameter is configured) for a related CORESET used to monitor a PDCCH.

For example, a terminal may combine every power of each RS to calculate (derive) signal power, combine all remaining power excluding RS power from RE (resource element) power of each RS to calculate (derive) interference plus noise power and calculate a SINR and a hypothetical BLER based on it.

In another example, a terminal may calculate (derive) signal power by a (weighted) average of power of each RS, calculate (derive) interference plus noise power by a (weighted) average of remaining power excluding RS power from RE power of each RS and calculate a SINR and a hypothetical BLER based on it.

This method also has an advantage that a base station does not need to perform a separate operation according to a quality change of TRPs, but like proposal 3 and 4, there is a limit that terminal complexity is higher than proposal 1 and 2.

When the proposals (e.g., proposal 1/2/3/4/5, etc.) are applied, a different proposal may be applied according to a separate configuration of a base station or a MTRP transmission method for a PDCCH/DCI. For example, it may be specified/configured that for PDCCH/DCI repeat transmission, proposal 3 is applied, for DCI fraction transmission, proposal 4 is applied and for PDCCH fraction transmission, proposal 5 is applied.

In the proposals, a variety of methods for a BFD RS determination and a hypothetical BLER calculation of a terminal when a plurality of QCL (type-D) reference RSs are configured/indicated to one CORESET (or CORESET group) are proposed.

If a plurality of CORESETs are configured for one or a plurality of component carriers (CC)/bandwidth parts (BWP) configured for a terminal, a process of selecting a BFD RS (or a RLM RS) for a plurality of CORESETs may be additionally performed after applying the proposal per each CORESET.

For example, a case is assumed that M (M is a natural number) CORESETs (with different TCI) are configured (across a specific CC/BWP or a plurality of CCs/BWPs). In this case, a terminal may be specified/configured to perform BFD (or RLM) only for QCL (type-D) RS(s) for corresponding CORESET(s) by selecting (up to) N (N≤M, N is a natural number) CORESET(s) by considering computational complexity of a terminal.

Here, N may be a specified value (e.g., N=2 for each CC/BWP) or a value configured by a base station. Alternatively, a value of N may be specified/configured differently according to a BFD (RS selection) method for each CORE-SET (or CORESET group). For example, when proposal 3/4/5 is applied, a terminal may calculate a hypothetical BLER or a RSRP for a plurality of RSs, which increases computational complexity compared with a case in which there is one QCL (type-D) RS, so it may be configured to apply N=1 per CC/BWP. On the other hand, when proposed technology 1/2 is applied or when only one CORESET TCI exists as before, it may be configured to apply N=2 per CC/BWP.

Here, a terminal may report the maximum applicable value of N to a base station in a form of a capability. In particular, a terminal may report a value of N for a case in which a plurality of TCI is configured for a CORESET (or a CORESET group) to a base station as a separate UE capability. In addition, a terminal may report a value of N which will be applied according to a BFD (RS selection) method (i.e., a method applied among proposal 1 to 5) for a CORESET (or a CORESET group) to a base station as a separate UE capability. For example, a terminal may separately report to a base station a value of N which will be applied when proposal 1/2 is applied and a value of N which will be applied when proposal 3/4/5 is applied, respectively.

As described above, when a plurality of QCL (type-D) reference RSs are configured for a specific CORESET (or CORESET group), the above-described proposals (e.g., proposal 1/2/3/4/5, etc.) may be applied by a RLM RS determination method for RLM (radio link monitoring). In other words, proposals of the present disclosure (e.g., proposal 1/2/3/4/5, etc.) may be also applied when determining a RLM RS and calculating a related hypothetical BLER. In this case, a value of N which will be applied (i.e., the number of CORESETs targeted for RLM) may be also defined/configured separately from a value of N for BFD (i.e., the number of CORESETs targeted for BFD). In addition, for a value of N which will be applied, as described above, a terminal may report a value of N for a case in which a plurality of TCI is configured for a CORESET to a base station as a UE capability. Alternatively, as a value of N which applied according to a BFD (RS selection) method (i.e., a method applied among proposal 1 to 5) for a CORESET (or a CORESET group) may be changed, a terminal may report a separate value of N to a base station according to an applied method.

Figure 8:
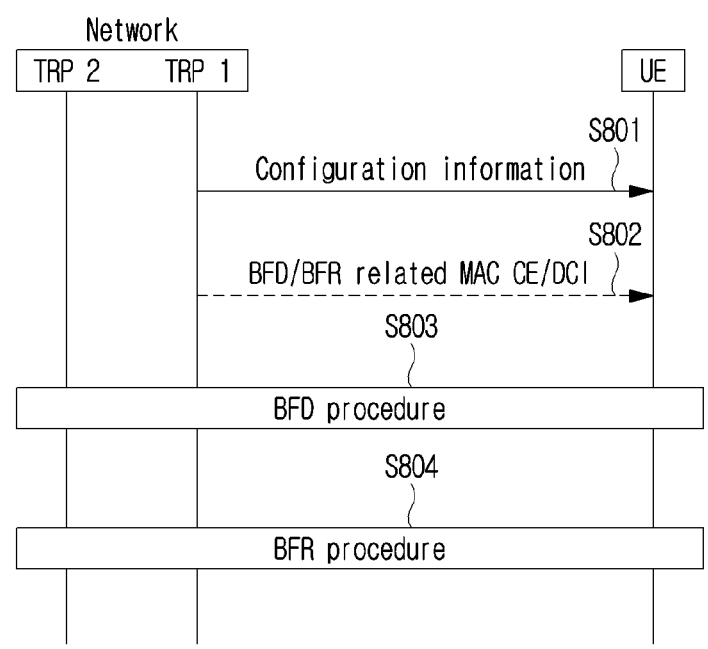
FIG. 8 illustrates a signaling method for a method of assessing radio link quality according to an embodiment of the present disclosure.

FIG. 8 illustrates a signaling method for a method of assessing radio link quality according to an embodiment of the present disclosure.

FIG. 8 illustrates signaling between a UE and a network (e.g., TRP 1, TRP 2) in a situation of multiple TRPs (i.e., M-TRPs, or multiple cells, hereinafter, all TRPs may be substituted with a cell) that methods proposed in the present disclosure (e.g., proposal 1/2/3/4/5, etc.) may be applied. Here, a UE/a Network is just an example, and may be substituted with a variety of devices and applied. FIG. 8 is just for convenience of a description, and it does not limit a scope of the present disclosure. In addition, some step(s) illustrated in FIG. 8 may be omitted according to a situation and/or a configuration, etc.

In reference to FIG. 8, for convenience of a description, signaling between 2 TRPs and a UE is illustrated, but a corresponding signaling method may be extended and applied to signaling between a plurality of TRPs and a plurality of UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on a plurality of TRPs, but it may be equally extended and applied to transmission through a plurality of panels. In addition, in the present disclosure, an operation that a terminal receives a signal from TRP1/TRP2 may be interpreted/described (or may be an operation) as an operation that a terminal receives a signal from a network (through/using TRP1/2) and an operation that a terminal transmits a signal to TRP1/TRP2 may be interpreted/described (or may be an operation) as an operation that a terminal transmits a signal to a network (through/using TRP1/TRP2) or may be inversely interpreted/described.

In reference to FIG. 8, a case is assumed that a UE receives a configuration/DCI from a representative TRP (e.g., TRP 1) in a situation of M-TRPs (or a cell, hereinafter, all TRPs may be substituted with a cell/a panel, or a case in which a plurality of CORESETs are configured from one TRP may be assumed as M-TRPs). It is just for convenience of a description, even when a UE receives a configuration/DCI from at least one TRP, a method described below may be extended and applied. In an example, the representative TRP may be a TRP which delivers/transmits to a UE a signal related to a system information block (SIB)/paging/a random access (RA).

A UE may receive configuration information related to M-TRP based transmission and reception through/using TRP 1 (and/or TRP 2) from a Network (S801). The configuration information may include information related to a configuration of a network (e.g., a TRP configuration)/M-TRP based transmission and reception (e.g., resource allocation, etc.), etc. In this case, the configuration information may be transmitted through higher layer signaling (e.g., RRC signaling, MAC-CE, etc.).

For example, the configuration information may include configuration information related to a BFD procedure and/or a BFR procedure described in the above-described proposal (e.g., proposal 1/2/3/4/5, etc.). In an example, the configuration information may include information on CORESET(s)/COREST group(s) related to each TRP (e.g., a TCI state(s) configuration related to a CORESET group/a CORESET group identifier (ID), etc.). In an example, the configuration information may include information for selecting/configurating part of a plurality of CORESETs (/CORESET groups) (e.g., the number of part). In an example, the configuration information may include information on BFD RS(s)/BFD RS set(s) related to the BFD procedure, and as the case may be, BFD RS(s)/BFD RS set(s) may not be explicitly configured/indicated. In an example, the configuration information may include information on a plurality of RSs (reference signal) for a spatial relation assumption (e.g., a QCL relation) configured for a specific CORESET (/CORESET group) (i.e., a RS or a QCL type D RS that a QCL related) o a spatial Rx parameter is configured). In an example, the configuration information may include configuration information on a BFRQ resource related to the BFR procedure. In an example, the configuration information may include a CORESET configuration.

For example, an operation that a UE in the above-described step S801 (100/200 in FIG. 11) receives the configuration information from a Network (100/200 in FIG. 11) may be implemented by a device in FIG. 11 which will be described below. For example, in reference to FIG. 11, one or more processors 102 may control one or more transceivers 106 and/or one or more memories 104, etc. to receive the configuration information and one or more transceivers 106 may receive the configuration information from a network.

A UE may receive BFD/BFR related information through MAC-CE and/or DCI through/with TRP 1 (and/or TRP 2) from a Network (S802). For example, as in the above-described proposal (e.g., proposal 1/2/3/4/5, etc.), a UE may receive information related to a BFD procedure and/or a BFR procedure through MAC-CE signaling and/or DCI. For example, as described in proposal 2, information indicating/configuring a RS which will be used as a BFD RS among a plurality of RSs (reference signal) for the spatial relation assumption (e.g., a QCL relation) (i.e., a RS or a QCL type D RS that a QCL related to a spatial Rx parameter is configured) may be received through MAC-CE and/or DCI.

For example, an operation that a UE in the above-described step S802 (100/200 in FIG. 11) receives the BFD/BFR related information from a Network (100/200 in FIG. 11) may be implemented by a device in FIG. 11 which will be described below. For example, in reference to FIG. 11, one or more processors 102 may control one or more transceivers 106 and/or one or more memories 104, etc. to receive the BFD/BFR related information and one or more transceivers 106 may receive the BFD/BFR related information from a network.

A UE may perform a BFD procedure with a network (through/using TRP 1 and/or TRP 2) S803. For example, a UE may perform the BFD procedure based on the above-described proposal (e.g., proposal 1/2/3/4/5, etc.). For example, a UE may perform a BFD procedure based on a BFD RS. For example, as described in the above-described proposal (e.g., proposal 1/2/3/4/5, etc.), when a plurality of QCL (type-D) reference RSs are configured for a specific CORESET (or CORESET group) and a BFD RS is not separately configured by higher layer signaling (e.g., the above-described configuration information), a UE may perform a BFD procedure based on/by using one of i) one predefined QCL (type-D) RS, ii) a QCL (type-D) RS configured by a base station/a TRP, iii) a QCL (type-D) RS corresponding to best quality (e.g., a lowest hypothetical BLER/a highest RSRP, etc.), iv) a QCL (type-D) RS corresponding to worst quality (e.g., a highest hypothetical BLER/a lowest RSRP) and v) a plurality of QCL (type-D) RSs (i.e., one of i)~v)).

For example, when a plurality of CORESETs (/CORESET groups) are configured, a BFD procedure may be performed in part of them. For example, when a hypothetical BLER is equal to or greater than a threshold for a BFD RS (e.g., a QCL (type-D) reference RS) (i.e., when radio link quality is worse than a threshold), a terminal increases a counter for a BFI (beam failure instance) one by one. And, when a BFI counter becomes equal to or greater than a specific value (within a certain time of period), a terminal may declare a BF (beam failure) and initiate transmission of a BFR-PRACH (a Rel-15 BFR method, i.e., BFR for SpCell) or a BFR-PUCCH/a BFR-MAC-CE (a Rel-16 BFR method, i.e., BFR for SCell).

For example, an operation that a UE in the above-described step S803 (100/200 in FIG. 11) performs the BFD procedure with a network (100/200 in FIG. 11) may be implemented by a device in FIG. 11 which will be described below. For example, in reference to FIG. 11, one or more processors 102 may control one or more transceivers 106 and/or one or more memories 104, etc. to perform the BFD procedure and one or more transceivers 106 may perform transmission and reception related to the BFD procedure with a network.

A UE may perform a BFR procedure with a network (through/using TRP 1 and/or TRP 2) (S804). For example, a UE may perform the BFR procedure based on the above-described proposal (e.g., proposal 1/2/3/4/5, etc.).

For example, an operation that a UE in the above-described step S804 (100/200 in FIG. 11) performs the BFR procedure with a network (100/200 in FIG. 11) may be implemented by a device in FIG. 11 which will be described below. For example, in reference to FIG. 11, one or more processors 102 may control one or more transceivers 106 and/or one or more memories 104, etc. to perform the BFR procedure and one or more transceivers 106 may perform transmission and reception related to the BFR procedure with a network.

As mentioned above, the above-described Network/UE signaling and operation (e.g., proposal 1/proposal 2/proposal 3/proposal 4/proposal 5/FIG. 8, etc.) may be implemented by a device (e.g., FIG. 11) which will be described below. For example, a Network (e.g., TRP 1/TRP 2) may correspond to a first wireless device and a UE may correspond to a second wireless device and in some cases, the opposite may be considered.

Figure 11:
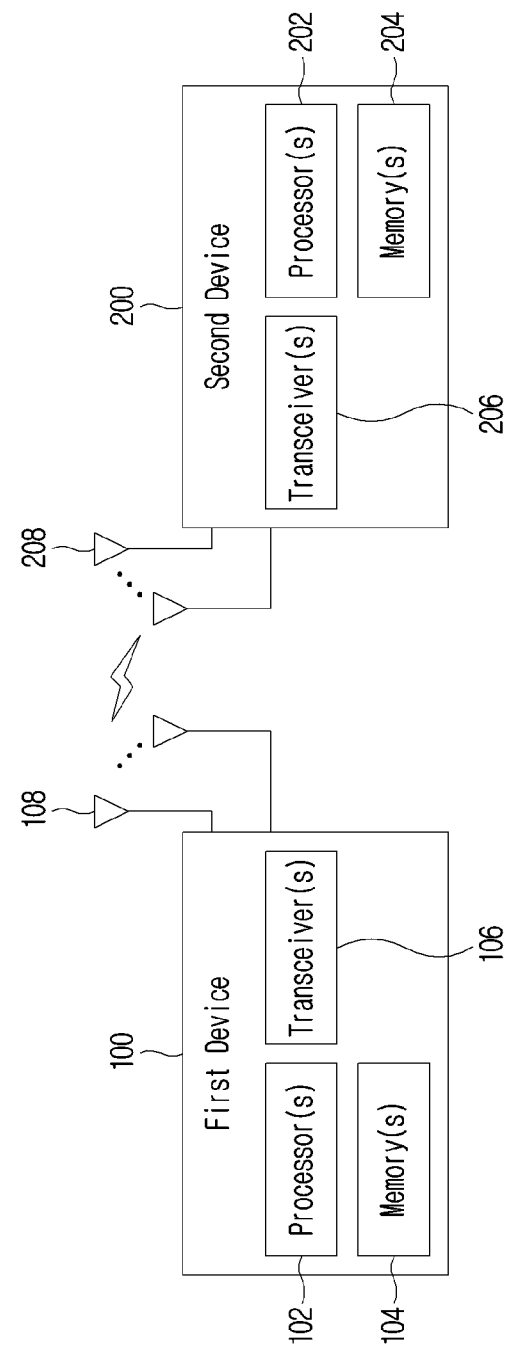
FIG. 11 is a diagram which illustrates a block diagram of a wireless communication device according to an embodiment of the present disclosure.

For example, the above-described Network/UE signaling and operation (e.g., proposal 1/proposal 2/proposal 3/proposal 4/proposal 5/FIG. 8, etc.) may be processed by one or more processors in FIG. 11 (e.g., 102, 202) and the above-described Network/UE signaling and operation (e.g., proposal 1/proposal 2/proposal 3/proposal 4/proposal 5/FIG. 8, etc.) may be stored in a memory (e.g., one or more memories in FIG. 11 (e.g., 104, 204)) in a form of a command/a program (e.g., an instruction, an executable code) for operating at least one processor in FIG. 11 (e.g., 102, 202).

Figure 9:
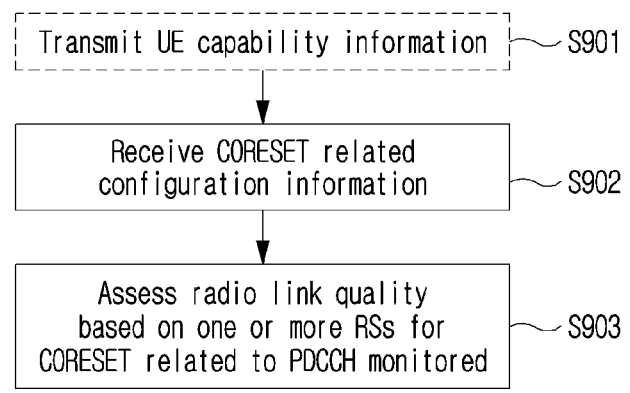
FIG. 9 is a diagram which illustrates an operation of a terminal for a method of assessing radio link quality according to an embodiment of the present disclosure.

FIG. 9 is a diagram which illustrates an operation of a terminal for a method of assessing radio link quality according to an embodiment of the present disclosure.

FIG. 9 illustrates an operation of a terminal based on the proposal 1 to proposal 5. An example in FIG. 9 is for convenience of a description, and it does not limit a scope of the present disclosure. Some step(s) illustrated in FIG. 9 may be omitted according to a situation and/or a configuration. In addition, in FIG. 9, a terminal is just one example, and may be implemented by a device illustrated in the following FIG. 11. For example, a processor 102/202 in FIG. 11 may control to transmit and receive a channel/a signal/data/information, etc. by using a transceiver 106/206 and may also control to store a channel/a signal/data/information, etc. which will be transmitted or received in a memory 104/204.

In addition, an operation in FIG. 9 may be processed by one or more processors 102 and 202 in FIG. 11 and an operation in FIG. 9 may be stored in a memory (e.g., one or more memories (104, 204) in FIG. 11) in a form of a command/a program (e.g., an instruction, an executable code) for operating at least one processor (e.g., 102, 202) in FIG. 11.

In reference to FIG. 9, a terminal may transmit UE capability information to a base station (S901).

As described above, M (M is a natural number) CORESETs (or CORESET groups) are configured for the terminal and the radio link quality may be assessed based on a RS for N (N≤M, N is a natural number) CORESETs (or CORESET groups) among the M CORESETs. In this case, UE capability information may include the maximum value of N which can be supported by a terminal. In addition, the value of N may be a value which was predetermined or configured by a base station. In this case, Step S901 may be omitted. In addition, when M (M is a natural number) CORESETs are configured for the terminal, the radio link quality may be assessed based on a RS for all M CORESETs and in this case, Step S901 may be omitted. In addition, as described above, when a plurality of TCI is configured for a plurality of CORESETs (or CORESET groups), the maximum value of N which can be supported by a terminal may be reported to a base station as separate UE capability information. Alternatively, a value of N which will be applied according to a BFD (RS selection) method for a CORESET (or a CORESET group) may be reported to a base station as a separate UE capability.

A terminal receives configuration information related to a CORESET (control resource set) from a base station (S902).

Here, configuration information may include information on one or more reference signals configured per each CORESET. Here, a reference signal may include a QCL (type-D) reference RS (i.e., a RS that a QCL related to a spatial Rx parameter is configured). In addition, for example, configuration information may include one or more TCI state information configured per each CORESET. And, each TCI state may include information on one or more reference signals. Here, a reference signal may include a QCL (type-D) reference RS (i.e., a RS that a QCL related to a spatial Rx parameter is configured).

As described above, one or more search spaces may be configured for a terminal and a CORESET ID may be configured per each search space. In this case, configuration information may include information on a CORESET identified by a CORESET ID related to each search space.

A terminal assesses radio link quality based on one or more reference signals (RS) for a CORESET related to a PDCCH monitored by a terminal (S903).

Here, assessing radio link quality may mean comparing a hypothetical BLER (or a SINR, a RSRP) with a threshold as described above.

In addition, radio link quality may be assessed based on one or more reference signals among a plurality of reference signals that a QCL (quasi co-location) related to a spatial Rx parameter for a CORESET is configured (i.e., QCL type-D).

Here, according to the proposal 1, a terminal may assess radio link quality based on one reference signal selected according to a predetermined rule among a plurality of reference signals for a CORESET. When a plurality of TCI states for a CORESET are configured and a plurality of reference signals are configured by each of the plurality of TCI states, one reference signal may be determined according to a TCI state selected according to a predetermined rule among a plurality of TCI states.

In addition, according to the proposal 2, radio link quality may be assessed based on one reference signal configured by a base station among a plurality of reference signals for the CORESET. When a plurality of TCI states for a CORESET are configured and a plurality of reference signals are configured by each of the plurality of TCI states, one reference signal may be determined by a specific (e.g., first) TCI state among a plurality of TCI states. Here, an order of a plurality of TCI states may be configured by a base station. In addition, which TCI state among a plurality of TCI states determines one reference signal may be configured by a base station.

In addition, according to the proposal 3, radio link quality may be assessed based on one reference signal having best quality among a plurality of reference signals for a CORESET. Here, a reference signal having best quality may be a reference signal having a lowest hypothetical BLER or a highest RSRP.

In addition, according to the proposal 4, radio link quality may be assessed based on one reference signal having worst quality among a plurality of reference signals for the CORE- SET. Here, a reference signal having worst quality may be a reference signal having a highest hypothetical BLER or a lowest RSRP.

In addition, according to the proposal 5, radio link quality may be assessed based on all of a plurality of reference signals for the CORESET. Here, signal strength may be derived by combining strength of a plurality of reference signals for a CORESET, interference and noise strength may be derived by combining strength excluding strength of each of the plurality of reference signals from strength of each RE of a plurality of reference signals for a CORESET and radio link quality may be assessed based on signal strength and the interference and noise strength. Alternatively, signal strength may be derived by performing weighted average for strength of a plurality of reference signals for a CORESET, interference and noise strength may be derived by performing weighted average for strength excluding strength of each of the plurality of reference signals from strength of each RE of a plurality of reference signals for a CORESET and radio link quality may be assessed based on signal strength and interference and noise strength.

In addition, radio link quality may be assessed based on a reference signal of each of a plurality of reference signals for a CORESET. In this case, radio link quality may be assessed based on each hypothetical BLER through each reference signal.

A terminal may assess radio link quality with the method and perform a BFD or RLM operation with (based on) such an assessment. For example, when a terminal which assessed radio link quality by using the method declares a beam failure, a terminal may transmit a BFRQ (beam failure recovery request) message to a base station. And, a base station which received a BFRQ may perform beam recovery through a variety of processes such as beam RS transmission, beam reporting request, etc. for beam recovery. Alternatively, for RLM, when a terminal which assessed radio link quality by using the method determines it as out-of-sync, a terminal may perform an operation such as RRC connection re-establishment, handover, cell reselection, cell measurement, etc.

Figure 10:
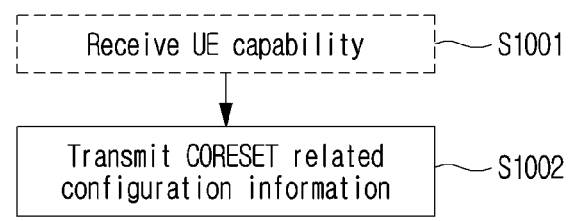
FIG. 10 is a diagram which illustrates an operation of a base station for supporting assessment of radio link quality according to an embodiment of the present disclosure.

FIG. 10 is a diagram which illustrates an operation of a base station for supporting assessment of radio link quality according to an embodiment of the present disclosure.

In reference to FIG. 10, FIG. 10 illustrates an operation of a base station based on the proposal 1 to proposal 5. An example in FIG. 10 is for convenience of a description, and it does not limit a scope of the present disclosure. Some step(s) illustrated in FIG. 10 may be omitted according to a situation and/or a configuration. In addition, in FIG. 10, a base station is just one example, and may be implemented by a device illustrated in the following FIG. 11. For example, a processor 102/202 in FIG. 11 may control to transmit and receive a channel/a signal/data/information, etc. by using a transceiver 106/206 and may control to store a channel/a signal/data/information, etc. which will be transmitted or received in a memory 104/204.

In addition, an operation in FIG. 10 may be processed by one or more processors 102 and 202 in FIG. 11 and an operation in FIG. 10 may be stored in a memory (e.g., one or more memories (104, 204) in FIG. 11) in a form of a command/a program (e.g., an instruction, an executable code) for operating at least one processor (e.g., 102, 202) in FIG. 11.

In reference to FIG. 10, a base station may receive UE capability information from a terminal (S1001).

As described above, M (M is a natural number) CORESETs (or CORESET groups) are configured for the terminal and the radio link quality may be assessed based on a RS for N (N≤M, N is a natural number) CORESETs (or CORESET groups) among the M CORESETs. In this case, UE capability information may include a value of N which can be supported by a terminal. In addition, the value of N may be a value which was predetermined or configured by a base station. In this case, Step S1001 may be omitted. In addition, when M (M is a natural number) CORESETs are configured for the terminal, the radio link quality may be assessed based on a RS for all M CORESETs and in this case, Step S1001 may be omitted. In addition, as described above, when a plurality of TCI is configured for a plurality of CORESETs (or CORESET groups), the maximum value of N which can be supported by a terminal may be reported to a base station as separate UE capability information. Alternatively, a value of N which will be applied according to a BFD (RS selection) method for a CORESET (or a CORESET group) may be reported to a base station as a separate UE capability.

A base station transmits configuration information related to a CORESET (control resource set) to a terminal (S1002).

Here, configuration information may include information on one or more reference signals configured per each CORESET. Here, a reference signal may include a QCL (type-D) reference RS (i.e., a RS that a QCL related to a spatial Rx parameter is configured). In addition, for example, configuration information may include one or more TCI state information configured per each CORESET. And, each TCI state may include information on one or more reference signals. Here, a reference signal may include a QCL (type-D) reference RS (i.e., a RS that a QCL related to a spatial Rx parameter is configured).

As described above, one or more search spaces may be configured for a terminal and a CORESET ID may be configured per each search space. In this case, configuration information may include information on a CORESET identified by a CORESET ID related to each search space.

Subsequently, a terminal assesses radio link quality based on one or more reference signals (RS) for a CORESET related to a PDCCH monitored by a terminal according to the proposal. Here, assessing radio link quality may mean comparing a hypothetical BLER (or a SINR, a RSRP) with a threshold as described above. In addition, radio link quality may be assessed based on one or more reference signals among a plurality of reference signals that a QCL (quasi co-location) related to a spatial Rx parameter for a CORESET is configured (i.e., QCL type-D).

Here, according to the proposal 1, a terminal may assess radio link quality based on one reference signal selected according to a predetermined rule among a plurality of reference signals for a CORESET. When a plurality of TCI states for a CORESET are configured and a plurality of reference signals are configured by each of the plurality of TCI states, one reference signal may be determined according to a TCI state selected according to a predetermined rule among a plurality of TCI states.

In addition, according to the proposal 2, radio link quality may be assessed based on one reference signal configured by a base station among a plurality of reference signals for the CORESET. When a plurality of TCI states for a CORESET are configured and a plurality of reference signals are configured by each of the plurality of TCI states, one reference signal may be determined by a specific (e.g., first) TCI state among a plurality of TCI states. Here, an order of a plurality of TCI states may be configured by a base station. In addition, which TCI state among a plurality of TCI states determines one reference signal may be configured by a base station.

In addition, according to the proposal 3, radio link quality may be assessed based on one reference signal having best quality among a plurality of reference signals for a CORESET. Here, a reference signal having best quality may be a reference signal having a lowest hypothetical BLER or a highest RSRP.

In addition, according to the proposal 4, radio link quality may be assessed based on one reference signal having worst quality among a plurality of reference signals for the CORESET. Here, a reference signal having worst quality may be a reference signal having a highest hypothetical BLER or a lowest RSRP.

In addition, according to the proposal 5, radio link quality may be assessed based on all of a plurality of reference signals for the CORESET. Here, signal strength may be derived by combining strength of a plurality of reference signals for a CORESET, interference and noise strength may be derived by combining strength excluding strength of each of the plurality of reference signals from strength of each RE of a plurality of reference signals for a CORESET and radio link quality may be assessed based on signal strength and the interference and noise strength. Alternatively, signal strength may be derived by performing weighted average for strength of a plurality of reference signals for a CORESET, interference and noise strength may be derived by performing weighted average for strength excluding strength of each of the plurality of reference signals from strength of each RE of a plurality of reference signals for a CORESET and radio link quality may be assessed based on signal strength and interference and noise strength.

In addition, radio link quality may be assessed based on a reference signal of each of a plurality of reference signals for a CORESET. In this case, radio link quality may be assessed based on each hypothetical BLER through each reference signal.

When a beam failure is declared by a terminal which assessed radio link quality by using the method, a base station may receive a BFRQ (beam failure recovery request) message from a terminal. And, a base station which received a BFRQ may perform beam recovery through a variety of processes such as beam RS transmission, beam reporting request, etc. for beam recovery. In other words, a base station may perform BFR. Alternatively, for RLM, when a terminal which assessed radio link quality by using the method determines it as out-of-sync, a terminal may perform an operation such as RRC connection re-establishment, handover, cell reselection, cell measurement, etc. and a base station may perform a relevant operation according to a procedure determined by a terminal.

General Device to which the Present Disclosure May be Applied

FIG. 11 is a diagram which illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a terminal in a wireless communication system, the method comprising:
receiving configuration information for configuring a control resource set (CORESET) including information related to transmission configuration indication (TCI) state from a base station;
based on a set of reference signals for detecting beam failure being not provided to the terminal, determining the set of reference signals based on one or more reference signals informed by the information related to TCI state for the CORESET that the terminal uses for monitoring a physical downlink control channel (PDCCH); and
assessing radio link quality according to the set of reference signals,
wherein, based on the CORESET that the terminal uses for monitoring the PDCCH including information related to two TCI states, a plurality of reference signals associated with the information related to two TCI states are included in the set of reference signals, and
wherein the radio link quality is assessed based on a single value derived by using the plurality of reference signals related to the CORESET.

2. The method of claim 1, wherein signal strength, as the single value, is derived by combining strength of the plurality of reference signals associated with the information related to two TCI states,
wherein interference and noise strength is derived by combining strength excluding strength of each of the plurality of reference signals from strength of each resource element of the plurality of reference signals associated with the information related to two TCI states,
wherein the radio link quality is assessed based on the signal strength and the interference and noise strength.

3. The method of claim 1, wherein signal strength, as the single value, is derived by performing weighted average for strength of the plurality of reference signals associated with the information related to two TCI states,
wherein interference and noise strength is derived by performing weighted average for strength excluding strength of each of the plurality of reference signals from strength of each resource element of the plurality of reference signals associated with the information related to two TCI states,
wherein the radio link quality is assessed based on the signal strength and the interference and noise strength.

4. The method of claim 1, wherein the CORESET is on of M (M is a natural number) CORESETs that are configured for the terminal,
wherein the radio link quality is assessed based on reference signals for N (N≤M, N is the natural number) CORESETs among the M CORESETs.

5. The method of claim 4, wherein a value of N is predetermined or configured by the base station.

6. The method of claim 4, further comprising:
transmitting, to the base station, capability information including a maximum value of N which can be supported by the terminal.

7. The method of claim 1, wherein based on assessment of the radio link quality, a beam failure detection (BFD) or radio link monitoring (RLM) operation is performed.

8. A terminal operating in a wireless communication system, the terminal comprising:
one or more transceivers for transmitting and receiving a wireless signal; and
one or more processors controlling the one or more transceivers;
wherein the one or more processors are configured to:
receive configuration information for configuring a control resource set (CORESET) including information related to transmission configuration indication (TCI) state from a base station;
based on a set of reference signals for detecting beam failure being not provided to the terminal, determining the set of reference signals based on one or more reference signals informed by the information related to TCI state for the CORESET that the terminal used for monitoring a physical downlink control channel (PDCCH); and assess radio link quality according to the set of reference signals, wherein, based on the CORESET that the terminal uses for monitoring the PDCCH including information related to two TCI states, a plurality of reference signals associated with the information related to two TCI states are included in the set of reference signals, and wherein the radio link quality is assessed based on a single value derived by using the plurality of reference signals related to the CORESET.

9. A base station operating in a wireless communication system, the base station comprising:
one or more transceivers for transmitting and receiving a wireless signal; and
one or more processors controlling the one or more transceivers;
wherein the one or more processors are configured to:
transmit, to a terminal, configuration information for configuring a control resource set (CORESET) including information related to transmission configuration indication (TCI) state, wherein, based on a set of reference signals for detecting beam failure being not provided to the terminal, the set of reference signals is determined based on one or more reference signals informed by the information related to TCI state for the CORESET that the terminal used monitoring a physical downlink control channel (PDCCH), and wherein, based on the CORESET that the terminal uses for monitoring the PDCCH including information related to two TCI states, a plurality of reference signals associated with the information related to two TCI states are included in the set of reference signals; and receive, from the terminal, an uplink transmission related to a beam failure recovery procedure or a random access procedure based on radio link quality for the set of reference signals, wherein the radio link quality is assessed based on a single value derived by using the plurality of reference signals related to the CORESET.

* * * * *